United States Patent [19]

Cole

[11] Patent Number: 5,322,395
[45] Date of Patent: Jun. 21, 1994

[54] DATUM POINT FORM TOOL

[76] Inventor: Larry M. Cole, 1214 Hickory Hills Dr., Rochester Hills, Mich. 48309

[21] Appl. No.: 988,235

[22] Filed: Dec. 9, 1992

[51] Int. Cl.$^5$ .................. B23B 27/06; B23B 29/22
[52] U.S. Cl. ............................... 407/99; 407/101; 407/107; 407/113
[58] Field of Search ................... 82/13; 83/698; 241/292.1, 300; 407/99, 101, 102, 107, 113

[56] References Cited

U.S. PATENT DOCUMENTS

| | | |
|---|---|---|
| 1,140,988 | 5/1915 | Kunitz . |
| 2,052,607 | 12/1936 | Reaney . |
| 2,537,837 | 1/1951 | Labrozzi et al. . |
| 2,838,827 | 6/1958 | Wright . |
| 2,967,442 | 1/1961 | Forsyth et al. . |
| 3,102,326 | 9/1963 | Conti et al. . |
| 3,136,031 | 6/1964 | Cassidy ........................ 407/101 X |
| 3,191,262 | 6/1965 | Gustafson . |
| 3,197,841 | 8/1965 | Frommelt et al. . |
| 3,566,496 | 3/1971 | Kezirian . |
| 3,673,653 | 7/1972 | Kaser . |
| 3,754,309 | 8/1973 | Jones et al. . |
| 3,838,500 | 10/1974 | Wirfelt . |
| 3,844,008 | 10/1974 | Sletten . |
| 4,054,397 | 10/1977 | Crevier . |
| 4,123,194 | 10/1978 | Cave . |
| 4,174,916 | 11/1979 | Kezran . |
| 4,414,870 | 11/1983 | Peterson, Jr. et al. . |
| 4,573,832 | 3/1986 | Zinner ............................. 407/99 X |
| 4,979,849 | 12/1990 | Kezran ........................... 407/107 |
| 5,100,268 | 3/1992 | Nakayama ..................... 407/104 |

FOREIGN PATENT DOCUMENTS

| | | |
|---|---|---|
| 1281803 | 10/1968 | Fed. Rep. of Germany . |
| 341697 | 11/1959 | Switzerland . |
| 1454580 | 1/1989 | U.S.S.R. .......................... 407/102 |
| 979664 | 1/1965 | United Kingdom . |

*Primary Examiner*—Timothy V. Eley
*Attorney, Agent, or Firm*—Harness, Dickey & Pierce

[57] ABSTRACT

A tool has a tool body which defines a first seat into which is secured an anvil. The anvil and the tool body define a second seat into which a backup plate is located. The backup plate has a longitudinally extending groove which is used to locate a form tool cutting insert. A first clamp assembly exerts a clamping force on the insert and backup plate against the anvil in a first direction. A second clamp assembly exerts a clamping force on the insert and backup plate against the anvil in a second direction, the second direction being approximately 90° to the first direction. The insert has a cutting surface of a predetermined configuration on two opposite sides such that indexing of the cutting insert 180° will position the opposite cutting surface in the machining ready position. The backup plate has a complementary predetermined configuration to support each of the cutting surfaces of the insert. The clamping of the insert and backup plate against the anvil in two directions approximately 90° apart, enables a more accurate positioning of the insert and reduces the need for running set-up parts after each insert change or indexing.

20 Claims, 2 Drawing Sheets

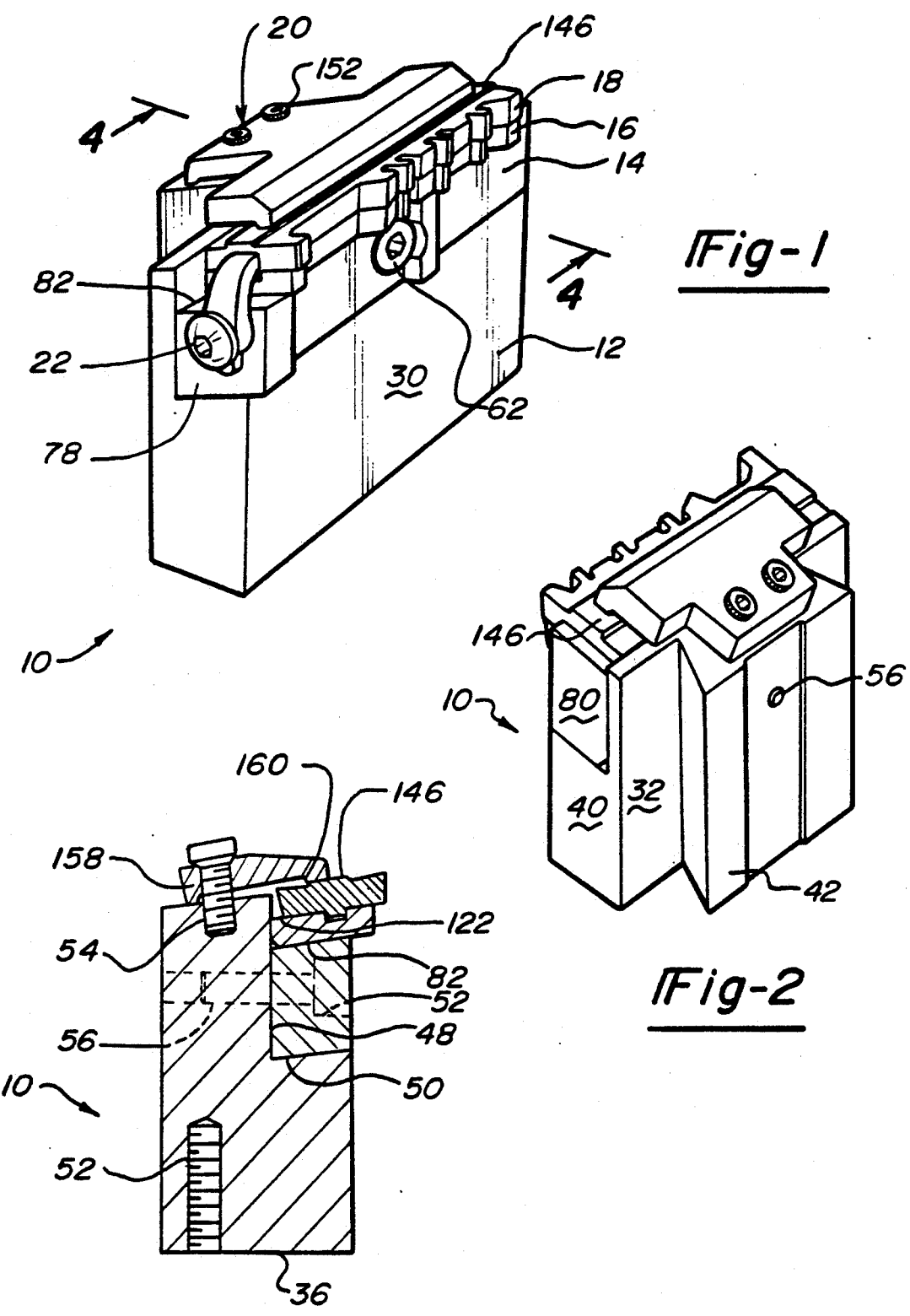

DATUM POINT FORM TOOL

FIELD OF THE INVENTION

The present invention relates to tools for material removal. More particularly, the present invention relates to forming tools having indexable and replaceable cutting inserts having at least one cutting edge formed in a pattern for generating a predetermined configuration in a rotating workpiece.

BACKGROUND OF THE INVENTION

The use of forming tools to generate various surface configurations in rotating workpieces has generally been known for many years. One conventional type of forming tool uses a cutting insert having a cutting edge which is formed in a prespecified configuration. The insert is forced against an object that is moving at a high speed relative to the cutting tool in order to generate a complementary surface configuration in the workpiece. The forming tool of this type is generally mounted in a movable tool holding assembly so that the tool is movable toward and away from a rotating workpiece along an axis that is substantially perpendicular to the rotating axis of the workpiece. The use of indexable and replaceable inserts in the form tool increases the life of the tool itself and also reduces the overall expense of using the tool. Instead of periodically replacing the tool in its entirety, the insert is simply indexed or replaced. This reduces both maintenance costs and down time since the tool need not be removed or resharpened.

An important element for this type of cutting tool is the arrangement for mounting and retaining the cutting insert on the tool. When using an indexable insert tool, the system or structure for mounting and retaining the indexable insert must accommodate the indexability feature. The cutting insert is placed under extreme forces during a machining operation, and it must be securely fastened to the cutting tool so that the insert will not move relative to its holder. Yet, the insert must be easy to remove from the tool for indexing or replacing, and the mounting system should operate to minimize the chance that the insert will be mispositioned on the tool when the insert is indexed or replaced. The mounting system for the insert must resist wear caused by flying material, e.g. metal, that is cut from the object being machined, and it should be relatively inexpensive to manufacture.

When using a pattern type forming tool, precise and secure positioning is particularly important. The pattern type forming tool is secured to a machine, such as a screw machine or a CNC turning center, and the machine is adjusted once in order for the pattern to be cut into the object in a desired position. Thereafter, the machine need not be readjusted, but the insert must remain in its proper position within tolerances. The machining process places changing forces on the insert depending on the pattern of the insert. For example, the left side of the insert may first engage the object being machined; then, as the machining operation continues, the right side may engage sometime thereafter, so that the force distribution and torque in the cutting insert are abruptly changing. In this type of process, the positioning and securing system for the cutting insert must be able to withstand abrupt changes in stress while reliably maintaining the insert in its proper position.

The cutting tool of the present invention solves the foregoing problems by providing a mounting and retaining system that creates a secure lock between the cutting insert and the cutting tool. The mounting and retaining system is easy and inexpensive to manufacture and the insert is easy to either index or replace.

SUMMARY OF THE INVENTION

The cutting tool of the present invention includes a tool holder having a dovetailed mounting surface on one face and a cutting tool mounting surface on an opposite face forming an undercut region. A backing plate is located in the undercut region. The backing plate has a longitudinally extending groove to locate the cutting insert and an exterior surface having a configuration substantially identical to the cutting edge of the insert. The cutting insert has a pair of contoured cutting edges opposite to each other and symmetrical to a mounting ridge extending longitudinally on the cutting insert. The mounting ridge of the cutting insert is engaged with the longitudinal groove of the backing plate. The engagement of the mounting ridge with the groove places one of the contoured cutting edges in position for machining and locates the opposite cutting edge such that contact with the tool holder is eliminated. The insert and the backing plate are both located against a shoulder stop extending from the tool holder. Clamping pressure secures the cutting insert on the backing plate and the backing plate against the undercut region. Clamping pressure also secures both the backing plate and the cutting insert against the shoulder stop on the tool holder. The indexing or replacement of the cutting insert can be accomplished by releasing the clamping pressure and indexing or replacing the cutting insert and re-applying the clamping pressure. The relationships with the undercut region with the backing plate, the cutting insert mounting ridge with the longitudinal groove on the backing plate, and the shoulder stop with both the insert and the backing plate insures accurate locating of the contoured cutting edge on the cutting insert.

From the subsequent detailed description, appended claims and drawings, other objects and advantages of the present invention will become apparent to those skilled in the art.

DESCRIPTION OF THE DRAWINGS

In the drawings which illustrate the best mode presently contemplated for carrying out the present invention:

FIG. 1 is a front perspective view of the forming tool of the present invention.

FIG. 2 is a rear perspective view of the forming tool shown in FIG. 1.

FIG. 4 is a vertical cross-sectional view of the forming tool taken along line 4—4 of FIG. 1.

DETAILED DESCRIPTION OF THE PREFERRED EMBODIMENT

Figure 3:
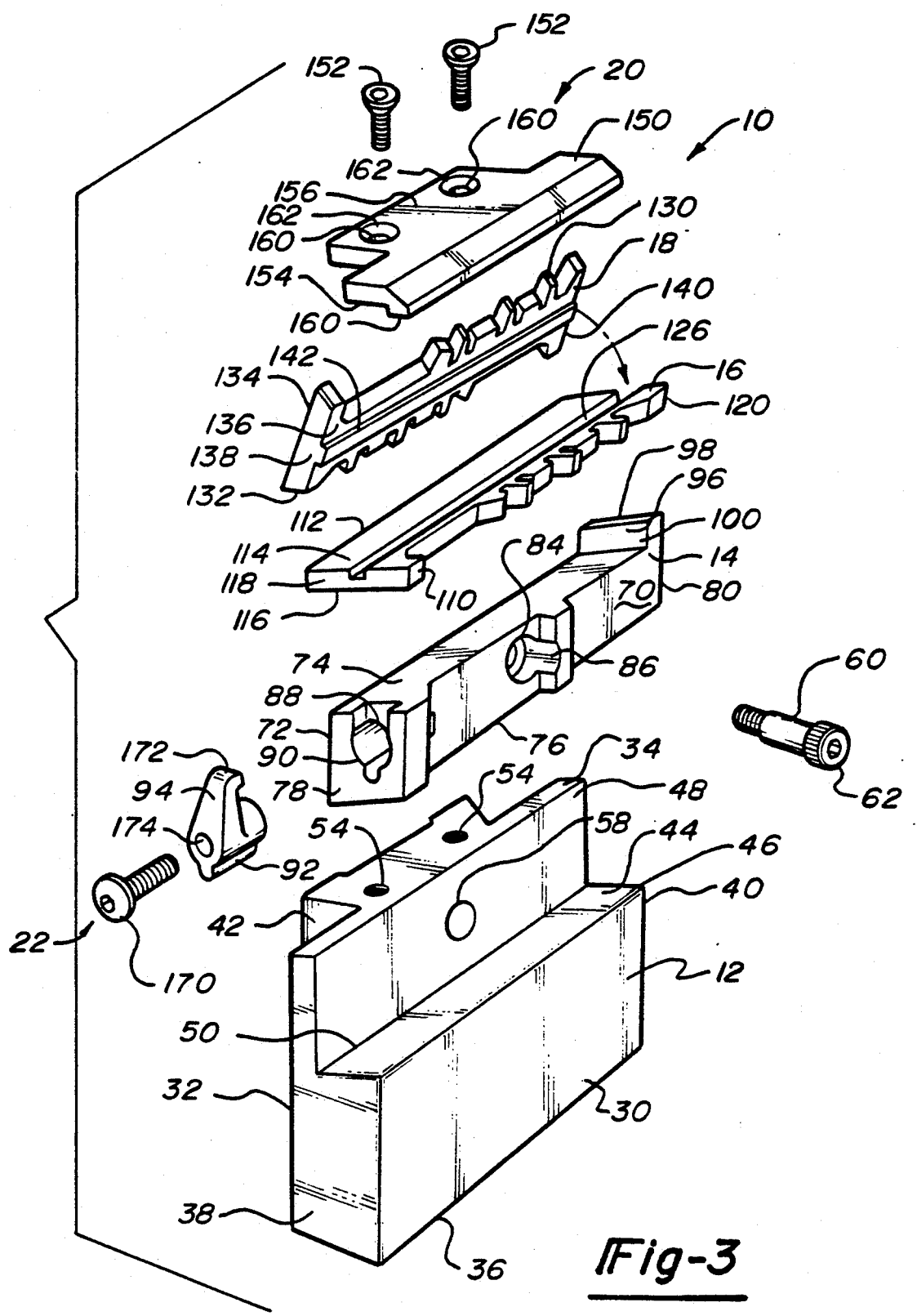
FIG. 3 is a front exploded perspective view of the forming tool shown in FIG. 1.

Referring now to the drawings in which like reference numerals designate like or corresponding parts throughout the several views, there is shown in FIGS. 1 through 4 a cutting tool 10 arranged in accordance with the present invention. Tool 10 comprises a tool holder 12, an anvil 14, a backup plate 16, a cutting insert 18, a first clamping system 20 and a second clamping system 22. The preferred embodiment includes anvil 14 to facilitate manufacturing of the tool 10. It is within the scope of the present invention to use a tool holder 12 with an integral anvil 14 for tool 10. As used in the following description, the terms horizontally, vertically, up and down, as well as adjectival and adverbial derivatives thereof (e.g., horizontally, upwardly, etc.) simply refer to the orientation of the illustrated structure in FIG. 1 as FIG. 1 faces the reader.

Tool holder 12 is generally a rectangular parallelpiped having a front face 30, a rear face 32, a top face 34, a bottom face 36, a side face 38 and a second side face 40. Rear face 32 includes a dovetail 42 which extends vertically between top face 34 and bottom face 36. Dovetail 42 is of conventional configuration and is adapted to be received in a machine tool for securing form tool 10 in the machine tool so that cutting insert 18 is engageable with a rotating workpiece in order to generate a predetermined surface configuration therein in a manner well known in the art. Front face 30 extends vertically, generally parallel to dovetail 42 and defines a step 44 having a generally horizontal face 46 connecting to a generally vertical face 48 which extends upward to meet top face 34. The angel formed between face 46 and face 48 is designed to be less than 90° (82° in the preferred embodiment) such that an undercut 50 is formed by step 44 for locating adjoining components relative to tool holder 12 as will be described later herein. Top face 34 may be angled downward from the junction of vertical face 48 and top face 34 as shown in FIGS. 1–4 to provide additional clearances for form tool 10 if desired. Tool holder 12 is provided with a plurality of drilled and tapped holes to facilitate the necessary attachment of components to tool holder 12 as well as attaching tool holder 12 to the machine tool. A tapped hole 52 extends vertically upward from and generally perpendicular to bottom face 36 and is used to locate and secure tool holder 12 to the machine tool. A pair of tapped holes 54 extend vertically downward from and generally perpendicular to top face 34. Tapped holes 54 locate and secure first clamping system 20 to tool holder 12. In the preferred embodiment, a tapped hole 56 extends horizontally from and generally perpendicular to vertical 48 and provides for the locating and attachment of anvil 14 to tool holder 12. Tapped hole 56 is provided with a counterbore 58 for mating with a shoulder 60 on an attachment bolt 62 in order to be able to more precisely locate anvil 14 with respect to tool holder 12.

Anvil 14 is a parallelpiped having a front face 70, a rear face 72, a top face 74, a bottom face 76, a side face 78 and a second side face 80. The angle formed by rear face 72 and bottom face 76 is the same as that formed by face 46 and face 48 of tool holder 12. When assembled, rear face 72 of anvil 14 mates with face 48 of tool holder 12 and bottom face 76 of anvil 14 mates with face 46 of tool holder 12 and anvil 14 is nested within undercut 50. Top face 74 is generally parallel to bottom face 76 and thus forms a second undercut 82 for locating adjoining components relative to anvil 14. Anvil 14 has a hole 84 extending between front face 70 and rear face 72. The diameter of hole 84 is substantially identical to the counterbore 58 provided in tool holder 12. Hole 84 is provided with a counterbore 86 for countersinking attachment bolt 62 and presenting a smaller profile of form tool 10 to the machine tool. Attachment bolt 62 extends through hole 84 into counterbore 58 and is threadably engaged with tapped hole 56 to locate and secure anvil 14 to tool holder 12. Shoulder 60 on attachment bolt 62 is provided with a slip fit relationship with counterbore 58 and hole 84 to locate anvil 14 relative to tool holder 12. The width of anvil 14 is substantially identical to the width of tool holder 12 and the location of tapped hole 56, counterbore 58 and hole 84 are such that side face 78 aligns with side face 38 and second side face 80 aligns with second side face 40. When bolt 62 is tightened, the head is located in counterbore 86 to provide a low profile assembly. Anvil 14 is further provided with a tapped hole 88 for securing the second clamping system 22 to anvil 14. Tapped hole 88 extends from and is generally perpendicular to side face 78 and has a contoured counterbore 90 for mating with a contoured shoulder 92 on clamp 94 of second clamping system 22. The mating of shoulder 92 with counterbore 90 both locates and limits the rotation of clamp 94 relative to anvil 14. A shoulder 96 is formed by second side face 80, a top face 98 and an abutment face 100 and extends vertically upward from top face 74. Shoulder 96 is used to locate backup plate 16 and cutting insert 18 as will be described later herein.

Backup plate 16 is a generally rectangular plate which has a front face 110, a rear face 112, a top face 114, a bottom face 116, a side face 118 and a second side face 120. The angle formed by rear face 112 and bottom face 116 is the same as that formed by face 46 and face 48 of tool holder 12. When assembled, rear face 112 of plate 16 mates with face 48 of tool holder 12 and bottom face 116 of plate 16 mates with top face 74 of anvil 14. Top face 114 is generally parallel to bottom face 116 and thus forms a third undercut 122. Second side face 120 abuts face 100 of shoulder 96 for locating backup plate 16 horizontally in one direction relative to anvil 14. Front face 110 of plate 16 is provided with a predetermined contour which is similar to the contour to be machined into the object being turned. Top face 114 has a longitudinally running groove 126 extending into plate 16 for locating insert 18 relative to backup plate 16.

Insert 18 is a generally rectangular plate which has a front face 130, a rear face 132, a top face 134, a bottom face 136, a side face 138 and a second side face 140. Second side face 140 abuts face 100 of shoulder 96 for locating insert 18 horizontally in one direction with respect to anvil 14. Bottom face 136 has an outwardly extending longitudinally running ridge 142 contoured to mate with groove 126 in backup plate 16 to locate insert 18 horizontally in a second direction relative to backup plate 16. Top face 134 is provided with a chip forming land 146 which also provides a surface for mating with first clamping system 20. Front face 130 and rear face 132 are provided with a cutting edge and a predetermined contour which is to be machined into the object being turned. The contours and cutting edges are located on face 130 and 132 such that locating ridge 142 in groove 126 will position one contoured face and one cutting edge of insert 18 at a machining ready location while at the same time insuring clearance between the opposite contoured face and face 48 of tool holder 12. Indexing insert 18 180° and relocating ridge 142 in groove 126 will then position the opposite contoured face and opposite cutting edge at the machining ready location. In either position, side face 138 or second side face 140 abut face 100 for horizontally locating insert 18.

First clamping system 20 comprises a clamp 150 and a pair of screws 152. Clamp 150 has a bottom side 154, a top side 156, and a pair of elongated clamping pads 158 and 160 formed on bottom side 154. Pads 158 and 160 are formed along the front and rear extremities of bottom side 154 and are positioned so that when clamping system 20 is assembled to tool body 12, pad 158 is generally parallel to top face 34 of tool body 12 and pad 160 is generally parallel to chip forming land 146 of insert 18. A pair of spaced, substantially parallel bores 160, which are dimensioned for receiving screws 152, extend downwardly through clamp 150. Bores 160 are provided with a conical counterbore 162 for countersinking screws 152 and presenting a small profile for form tool 10. Tapped holes 54 and bores 160 are orientated so that when clamping system 20 is assembled on tool holder 12, pad 158 contacts tool holder 12 and pad 160 contacts chip forming land 146 on insert 18. Tightening of screws 150 increases the clamping pressure to backup plate 16 which increases the clamping pressure to anvil 14 which in turn increases the clamping pressure of anvil 14 to tool holder 12.

Second clamping system 22 comprises a clamp 94 and a screw 170. As described above, clamp 94 has a contoured shoulder 92 which mates with contoured counterbore 90 in anvil 14. The mating of shoulder 92 with counterbore 90 provides for axial movement of clamp 94 but does not permit significant rotational movement of clamp 94 with respect to anvil 14. Extending from shoulder 92 is clamping pad 172. When shoulder 92 is mated with counterbore 90, pad 172 contacts both insert 18 and backup plate 16. A bore 174 dimensioned for receiving screw 170 extends through shoulder 92. Screw 170 extends through bore 174 and is threadingly engaged with tapped hole 88 of anvil 14. Tightening of screw 170 increases the clamping pressure of insert 18 and backup plate 16 against abutment face 100 of shoulder 96.

Assembly of form tool 10 begins with locating anvil 14 in the undercut 50 of tool holder 12. Bolt 62 is then inserted through hole 84 of anvil 14, counterbore 50 of tool holder 12 and then threadably engaged with tapped hole 56. Tightening of bolt 62 locates and secures anvil 14 to tool holder 12. Backup plate 16 is then positioned in undercut 82 with second side face 120 abutting face 100 on shoulder 96. Insert 18 is then located on backup plate 16 by inserting ridge 142 of insert 18 into groove 126 of backup plate 16, with the respective side face of insert 18 abutting face 100 on shoulder 96. Next, first clamping system 20 is assembled to tool holder 12 and screws 152 are lightly tightened. Second clamping system 22 is then assembled to anvil 14 and screw 170 is tightened thus clamping insert 18 and backup plate 16 against face 100 on shoulder 96. Screws 152 are then tightened to complete the assembly of clamping insert 18, backup plate 16 and anvil 14 against tool holder 12. This assembly can be completed with form tool 10 either separate from or coupled to the machine tool.

When it becomes necessary to replace or index 18, screw 170 is loosened to remove the clamping force against shoulder 96, screws 152 are loosened a sufficient amount to be able to disengage ridge 142 from groove 126. Insert 18 can then be removed from tool holder 12. Insert 18 is then indexed 180° or replaced and the clamping systems 20 and 22 can be re-tightened according to the procedure outlined above to complete the assembly.

The need for running a series of setup pieces each time insert 18 is indexed or replaced can thus be eliminated by maintaining the dimension between face 100 on shoulder 96 and dovetail 42. Tool 10 is assembled using the dimension over a gage cylinder positioned on dovetail 42 to face 100 as a datum point. This dimension can be specified by the machine tool user such that once insert 18 is positioned and clamped into tool 10, no further adjustments of the machine are required. Additional inserts can be manufactured having the same relationship between the predetermined contours and the appropriate side of insert 18 such that assembling these additional inserts with tool 10 positions the cutting edge in the same position. Also, additional tools 10 can be manufactured maintaining the associated datum point dimension to be able to replace the entire tool 10 should it become damaged while maintaining the same dimensional relationships with the machine tool.

While the above detailed description describes the preferred embodiment of the present invention, it should be understood that the present invention is susceptible to modification, variation and alteration without deviating from the scope and fair meaning of the subjoined claims.

What is claimed is:

1. A tool having a cutting insert, said tool comprising:
   a body having means for securing said body to a machine tool and defining a seat, said seat being positioned at a specified location with respect to said securing means;
   a backup plate located in said seat, said backup plate having means for locating said cutting insert adjacent to said backup plate;
   means for exerting a clamping pressure between said insert and said backup plate and said body, said exerting means comprising:
   first means for clamping said insert and said backup plate to said body, said first clamping means secured to said body for exerting said clamping pressure in a first direction;
   second means for clamping said insert and said backup plate to said body, said second clamping means secured to said body for exerting said clamping pressure in a second direction, said second clamping means comprising a clamp member having a clamping pad and a screw threadably engaged with said body, said screw operable to exert a force on said clamp member such that said clamping pad exerts said clamping pressure in said second direction.

2. The forming tool of claim 1 wherein said seat is comprised of a first and second longitudinally extending planar surface, said second longitudinally extending planar surface disposed at an acute angle with respect to said first longitudinally extending planar surface.

3. The forming tool of claim 1 wherein said seat includes a first and second abutment surface, said second abutment surface being disposed generally perpendicular to said first abutment surface.

4. The forming tool of claim 3 wherein said first clamping means exerts said clamping pressure in said first direction against said first abutment surface.

5. The forming tool of claim 4 wherein said second clamping means exerts said clamping pressure in said second direction against said second abutment surface.

6. The tool of claim 1 further comprising an anvil secured to said body and defining said seat.

7. The forming tool of claim 6 wherein said seat is comprised of a first and second longitudinally extending planar surface, said second longitudinally extending planar surface disposed at an acute angle with respect to said first longitudinally extending planar surface.

8. The forming tool of claim 1 wherein said locating means includes a longitudinally extending groove.

9. The forming tool of claim 8 wherein said cutting insert includes a longitudinally extending ridge, said ridge cooperating with said longitudinally extending groove to locate said insert.

10. The forming tool of claim 1 wherein said cutting insert has a first cutting edge of a first predetermined configuration.

11. The forming tool of claim 10 wherein said cutting insert has a second cutting edge of said first predetermined configuration, said second cutting edge disposed opposite to said first cutting edge.

12. The forming tool of claim 10 wherein said backup plate includes a second predetermined configuration, said second predetermined configuration being substantially similar to said first predetermined configuration.

13. A tool having a cutting insert, said tool comprising:
- a body having means for securing said body to a machine tool and defining a seat, said seat being positioned at a specified location with respect to said securing means;
- means for exerting a clamping pressure between said insert and said body, said exerting means comprising:
  - first means for clamping said insert to said body, said first clamping means secured to said body for exerting said clamping pressure in a first direction;
  - second means for clamping said insert to said body, said second clamping means secured to said body for exerting said clamping pressure in a second direction, said second clamping means comprising a clamp member having a clamping pad and a screw threadably engaged with said body, said screw operable to exert a force on said clamp member such that said clamping pad exerts said clamping pressure in said second direction.

14. The forming tool of claim 13 wherein said seat is comprised of a first and second longitudinally extending planar surface, said second longitudinally extending planar surface disposed at an acute angle with respect to said first longitudinally extending planar surface.

15. The forming tool of claim 13 wherein said seat includes a first and second abutment surface, said second abutment surface being disposed generally perpendicular to said first abutment surface.

16. The forming tool of claim 15 wherein said first clamping means exerts said clamping pressure in said first direction against said first abutment surface.

17. The forming tool of claim 16 wherein said second clamping means exerts said clamping pressure in said second direction against said second abutment surface.

18. The tool of claim 13 further comprising an anvil secured to said body and defining said seat.

19. The forming tool of claim 18 wherein said seat is comprised of a first and second longitudinally extending planar surface, said second longitudinally extending planar surface disposed at an acute angle with respect to said first longitudinally extending planar surface.

20. A cutting tool comprising:
- a body having means for securing said body to a machine tool and defining a longitudinally extending seat, said seat being positioned at a specific location with respect to said securing means;
- a backup plate having a longitudinal width and located in said seat, said backup plate including a groove and a first predetermined configuration disposed along said longitudinal width of said backup plate;
- a unitary cutting insert having a longitudinal width disposed adjacent to said longitudinal width of said backup plate, said insert having a ridge disposed in said groove of said backup plate and a cutting edge of a second predetermined configuration, said ridge and said cutting edge disposed along said longitudinal width of said insert, said second predetermined configuration being substantially similar to said first predetermined configuration such that said backup plate provides support for said cutting edge; and
- means for exerting a clamping pressure between said insert, said backup plate and said body.

* * * * *